United States Patent
Jasper

(10) Patent No.: US 9,872,435 B2
(45) Date of Patent: Jan. 23, 2018

(54) HARVESTER TINE HAVING A FRONT-TO-REAR PARTING LINE IN ITS STRAP AND FINGER PORTION AND ONE OR MORE DEPRESSIONS ON ITS FINGER PORTION

(71) Applicant: HCC, Inc., Mendota, IL (US)

(72) Inventor: Edward Patrick Jasper, Mendota, IL (US)

(73) Assignee: HCC, Inc., Mendota, IL (US)

( * ) Notice: Subject to any disclaimer, the term of this patent is extended or adjusted under 35 U.S.C. 154(b) by 0 days.

(21) Appl. No.: 14/881,806

(22) Filed: Oct. 13, 2015

(65) Prior Publication Data

US 2016/0120119 A1    May 5, 2016

Related U.S. Application Data

(60) Provisional application No. 62/075,569, filed on Nov. 5, 2014.

(51) Int. Cl.
*A01D 57/02*    (2006.01)
(52) U.S. Cl.
CPC .................................. *A01D 57/02* (2013.01)
(58) Field of Classification Search
CPC ........ A01D 57/02; A01D 80/02; A01D 11/06; A01D 7/08
USPC .... 56/220, 400, 14.3, 14.4, 14.6, 16.1, 16.2, 56/17.3, 364, 400.16, 400.2
See application file for complete search history.

(56) References Cited

U.S. PATENT DOCUMENTS

| 2,840,975 A | 7/1958 | Koller |
| 3,613,346 A | 10/1971 | Hubbard |
| 3,616,631 A | 11/1971 | Quam |
| 3,796,030 A | 3/1974 | Neal et al. |
| 3,902,560 A | 9/1975 | van der Lely |
| 3,943,999 A | 3/1976 | van der Lely et al. |
| 3,957,122 A | 5/1976 | van der Lely |
| 3,960,219 A | 6/1976 | van der Lely |
| 4,033,418 A | 7/1977 | van der Lely |
| 4,235,294 A | 11/1980 | Barlage |
| D263,233 S | 3/1982 | van der Lely |
| 4,520,620 A | 6/1985 | Gessel et al. |
| 4,706,448 A | 11/1987 | Gessel et al. |

(Continued)

*Primary Examiner* — Robert E Pezzuto
(74) *Attorney, Agent, or Firm* — Clark Hill PLC; James R. Foley

(57) ABSTRACT

A tine for use with a harvester. The tine is preferably an injection molded polymer pickup reel tine, which uses a front-to-rear mold parting line direction. The tine preferably has a snap ring or strap portion which is configured to engage a bat tube, as well as a finger portion which is configured to engage the crop during harvesting. Preferably, the front-to-rear parting line is along both portions. The front-to-rear parting line allows for the ability to provide a deep front-to-rear cross section for rigidity at the high stress area of the tine. Two front-to-rear material saving features can be utilized to minimize material usage and allow for relative consistent wall thickness, which results in a rigid cross section that maintains deflection stability in the normal direction of deflection. The preferred form of the tine cross section includes three deep oval sections or projections, connected by two oval depressions, but other variations are entirely possible while still resulting in effectively the same benefits.

6 Claims, 7 Drawing Sheets

(56) References Cited

U.S. PATENT DOCUMENTS

| | | | |
|---|---|---|---|
| 4,882,899 A | 11/1989 | Jasper et al. | |
| 4,901,511 A * | 2/1990 | Yarmashev | A01D 57/02 |
| | | | 56/220 |
| 6,199,357 B1 | 3/2001 | Bloom | |
| 6,199,358 B1 | 3/2001 | Majkrzak | |
| 6,324,823 B1 | 12/2001 | Remillard | |
| 6,910,323 B2 | 6/2005 | Bickel | |
| 7,600,573 B2 | 10/2009 | Langworthy et al. | |
| 7,856,801 B2 | 12/2010 | Remillard | |
| 7,934,365 B2 | 5/2011 | Schumacher et al. | |
| 8,312,700 B2 | 11/2012 | Leiston | |
| 9,095,095 B2 * | 8/2015 | Mcgehee | A01D 80/02 |
| 9,338,943 B2 * | 5/2016 | Herringshaw | A01D 57/02 |
| 2003/0126848 A1 | 7/2003 | Bickel | |
| 2007/0266692 A1 * | 11/2007 | Lolley | A01D 57/02 |
| | | | 56/364 |
| 2007/0289280 A1 * | 12/2007 | Marquardt | A01D 57/02 |
| | | | 56/16.1 |
| 2014/0318097 A1 | 10/2014 | Herringshaw et al. | |

* cited by examiner

FIG. 1
FIG. 2
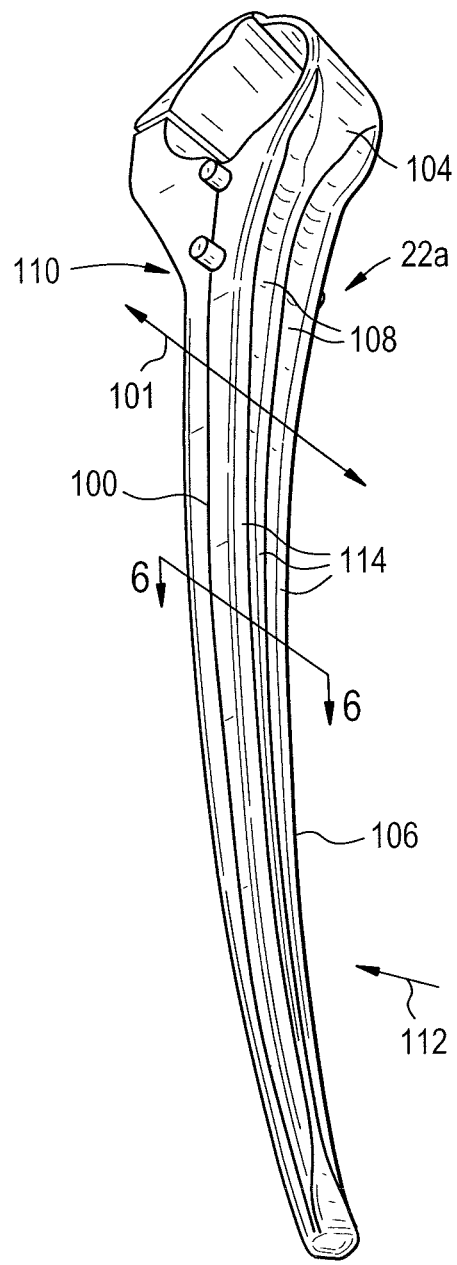
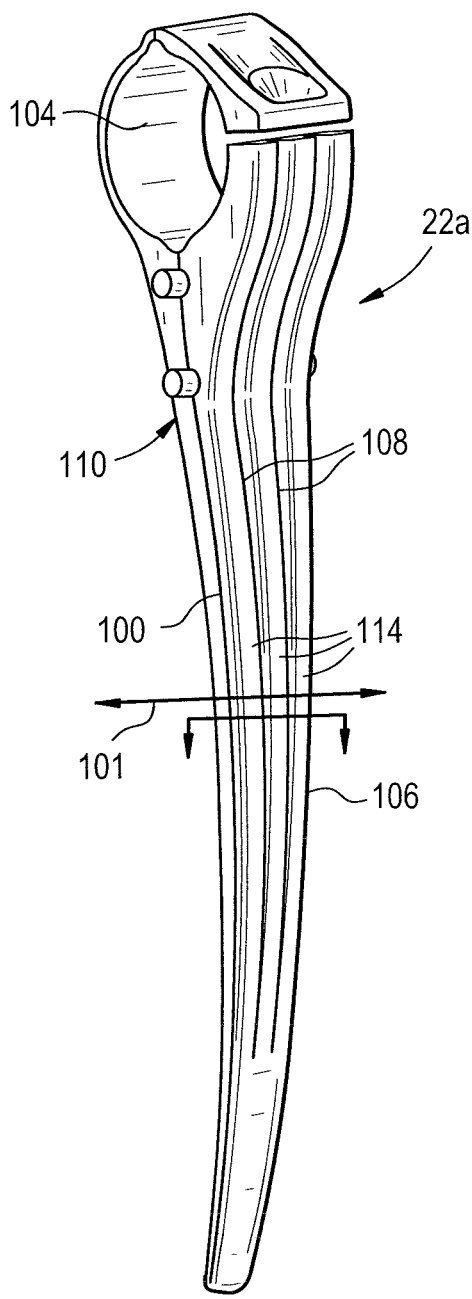

FIG. 7
FIG. 8
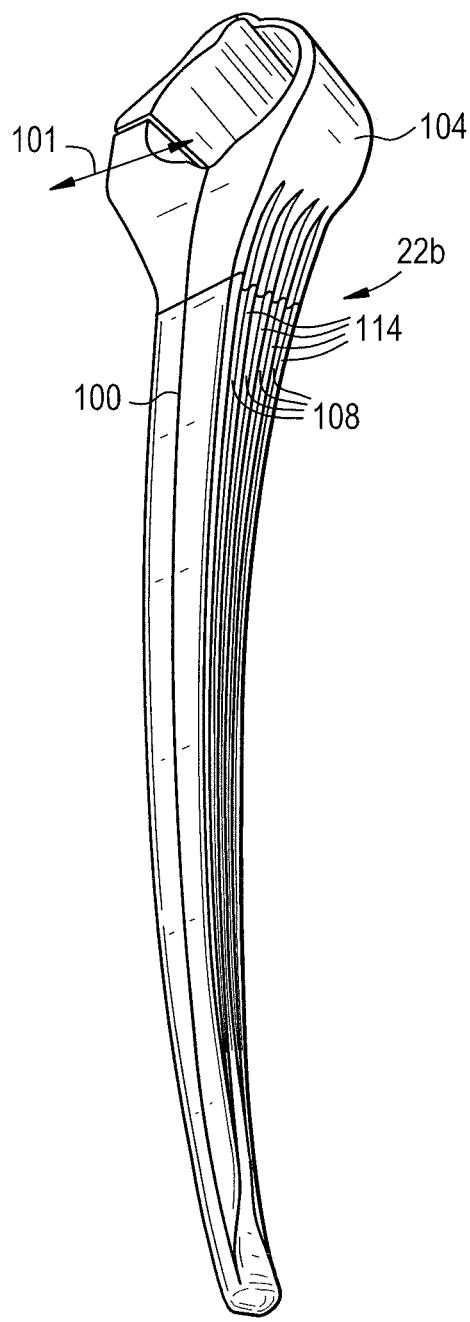
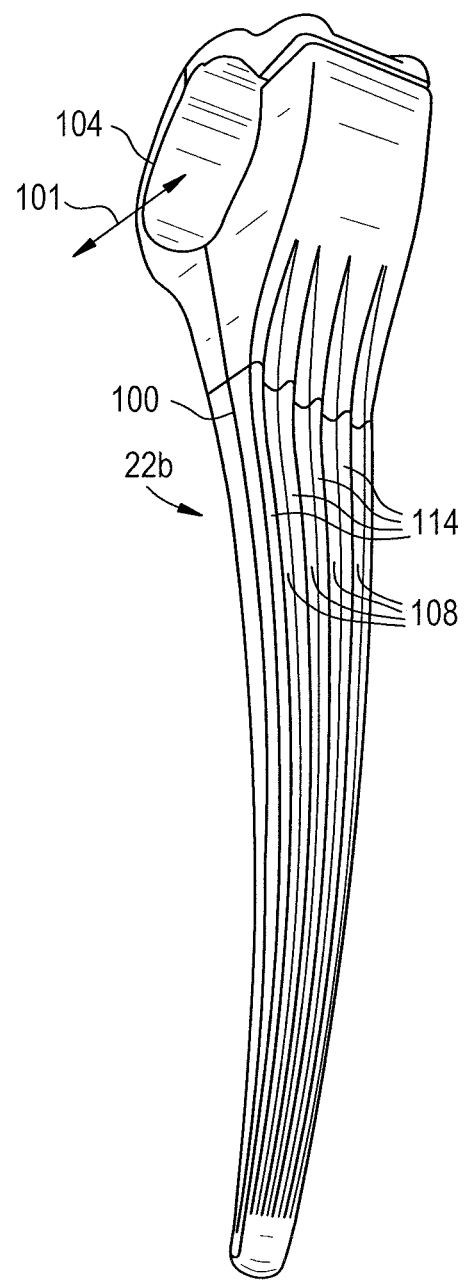

US 9,872,435 B2

HARVESTER TINE HAVING A FRONT-TO-REAR PARTING LINE IN ITS STRAP AND FINGER PORTION AND ONE OR MORE DEPRESSIONS ON ITS FINGER PORTION

RELATED APPLICATION (PRIORITY CLAIM)

This application claims the benefit of U.S. Provisional Application Ser. No. 62/075,569, filed Nov. 5, 2014, which is hereby incorporated herein by reference in its entirety.

BACKGROUND

The present invention generally relates to harvester tines.

A typical harvester includes a harvester platform including a frame supported for movement over ground, the frame having a front edge, a cutter bar extending along the front edge, and a pickup reel for lifting up crop into the harvester. In general, the pickup reel includes a reel support supported by the frame, a reel shaft rotatably supported by the reel support and extending along an axis transverse to the frame, and a plurality of arms extending radially from and being rotatable with the shaft. The pickup reel also includes a plurality of second shafts or bat tubes, each supported by at least one arm and being generally parallel to and radially spaced from the reel shaft, the bat tubes being rotatable relative to and rotatable with the arm, and a plurality of harvester tines supported by each bat tube for movement with the bat tube. During operation of the pickup reel, the tines engage the crop and lift it into the harvester.

Most conventional tines are injection molded, formed of a polymer, and have a parting line which is lateral. Conventional injection molded pickup reel polymer tine designs typically use a lateral parting line in the mold because that is the easiest way to build a mold for the traditional curved shape and integral tube bore. When a tine has a wrap-around feature that allows it to be fastened to a tubular bat section, it must be molded so the wrap-around has an integral tube bore that matches the diameter of the tubular bat section. Using a lateral parting line provides for a simple molding process, as the bore in the wrap-around runs in the direction of the parting line and is easily accomplished in the mold. If a front to rear parting line were to be used for tines with wrap-around features, mold design would become complicated as the bore would then be perpendicular to the parting line. For this reason, most tines with wrap-around features use a lateral parting line. However, lateral parting lines make it difficult to achieve a deep enough section in the high stress area of the tine (in operation) with acceptable deflection characteristics in the normal direction of deflection.

Assuming a tine has a lateral parting line, deep depressions cannot be provided on the tine's front and/or rear surfaces, because they need to be smooth to release from the mold. If deep depressions are provided on the tine's lateral surfaces (i.e., in order to try to help even out the wall thicknesses for improved processing and to minimize weight), these cross sectional shapes would have poor deflection characteristics in the normal direction of deflection, and would have a tendency to twist sideways as opposed to the preferable stable front-to-rear deflection.

SUMMARY

An object of an embodiment of the present invention is to provide a tine having a portion which is configured to engage and wrap around a bat tube, and which has a front-to-rear parting line. The tine also has a finger portion, and preferably the finger portion has at least one depression and/or projection.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIG. 1 is a perspective view of a front side of a tine, where the tine is in accordance with an embodiment of the present invention;

FIG. 2 is a view much like FIG. 1, but showing the tine from the rear;

FIGS. 7-12 illustrate tines which are in accordance with alternative embodiments of the present invention.

DESCRIPTION OF ILLUSTRATED EMBODIMENTS

Figure 3:
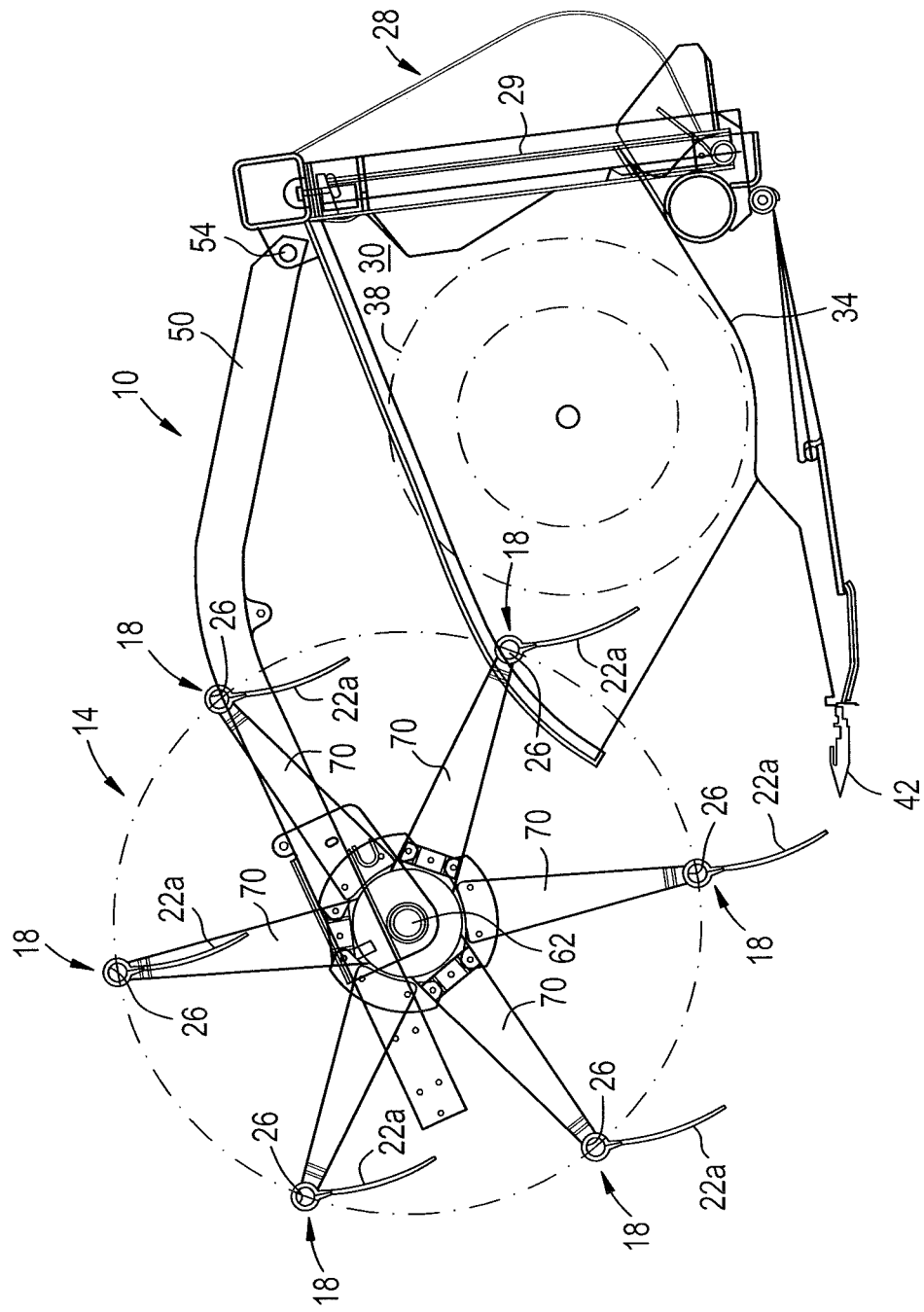
FIG. 3 provides a view of a harvester, with which the tine of FIGS. 1 and 2 can be employed.

While this invention may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

FIG. 1 is a perspective view of a front side of a tine 22*a* which is in accordance with an embodiment of the present invention. FIG. 2 is a view much like FIG. 1, but shows the tine 22*a* from the rear.

The tine 22*a* which is accordance with an embodiment of the present invention is meant to be employed with really any type of harvester or pick-up reel that uses tines. FIG. 3 is a side view of a conventional harvester 10 utilizing a pick-up reel 14, specifically a reel 14 that provides for standard tine action (i.e., that the tines do not flip during harvesting). Of course, the tine 22*a* disclosed herein (and the alternative embodiments discussed herein) can be used with a pick-up reel that provides that the tines flip. Regardless, as shown in FIG. 1, the harvester 10 includes the pick-up reel 14 and a harvester tine and bat tube assembly 18. The assembly 18 includes harvester tines 22*a* and bat tubes 26, and the harvester 10 includes a harvester platform 28 including a platform frame 29, supported for movement over ground, and side and rear wall 30. A floor 34 extends between the opposite side walls 30, and a transverse crop converging auger 38 is rotatably supported above the floor 34 and forward of the rear wall 30 (unless the harvester is provided as being a draper header type of harvester, in which case cross belts would be utilized instead of an auger). A transverse cutter bar 42 is mounted along the forward edge of the floor 34, and an upright crop dam 46 is supported between the cutter bar 42 and the floor 34.

The pick-up reel 14 generally spans the width of the platform 28, forward of the auger 38 and above the cutter bar 42. The pick-up reel 14 is connected to the platform 28 by a pair of reel support arms 50 (one shown) which support the pick-up reel 14 on the frame 29. In the construction illustrated in FIG. 3, the support arms 50 are pivotally connected to the frame 29 at pivot points 54. The support arms 50 are generally above the sidewalls 30 of the platform 28. Preferably, the support arms 50 are selectively vertically adjustable by a pair of cylinders (not shown) connected between the support arms 50 and the sidewalls 30.

A movable support structure 58 is supported at the forward end of each support arm 50. The support structures 58 are generally slidable between forward and rearward positions on the support arm 50, and their movement is controlled by a pair of cylinders (not shown). The support arms 50 and the support structures 58 are adjustably positioned to adjust the position of the pick-up reel 14 relative to the platform 28.

A tubular reel shaft or first shaft 62 is journalled by and extends between the support structures 58. The first shaft 62 is rotatable relative to the support structures 58 about its axis, and a plurality of arms 70 (six in the illustrated construction) radially extend from the shaft 62.

Bat tubes 26 are journalled in the outer ends of the arms 70. The bat tubes 26 are rotatable with the associated arms 70 and, in the illustrated construction, are rotatable relative to the associated arms 70. The bat tubes 26 span the width of the pick-up reel 14 and are generally parallel to and radially-spaced from the first shaft 62. A plurality of harvester tines 22a are connected to each bat tube 26 for movement with the bat tube 26 (in the illustrated construction, for rotation relative to the first shaft 62 and relative to the associated arms 70).

The above description regarding FIG. 3 was merely provided to explain one possible environment in which the present invention may exist, and should not be considered to be limiting in any way, as the present invention can be employed with reels and harvesters which are different than that which is illustrated in FIG. 3.

Figure 5:
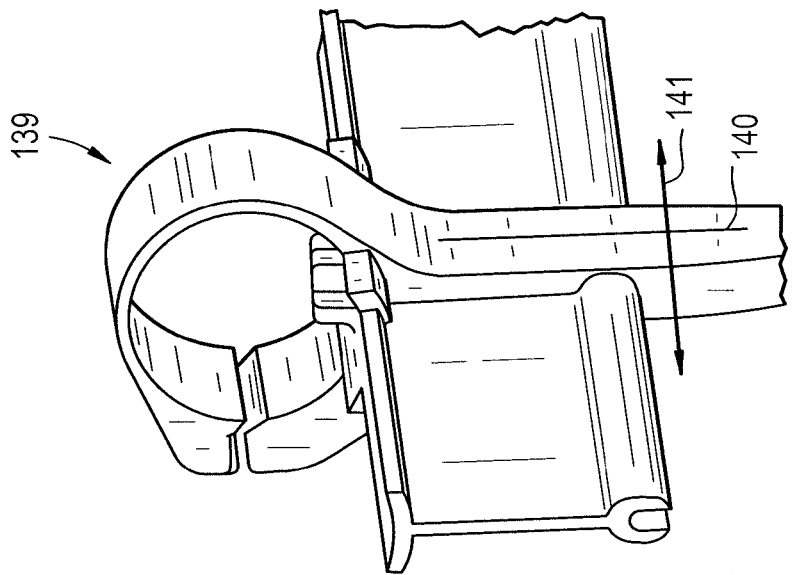
FIGS. 4 and 5 show tines with lateral parting lines.
Figure 4:
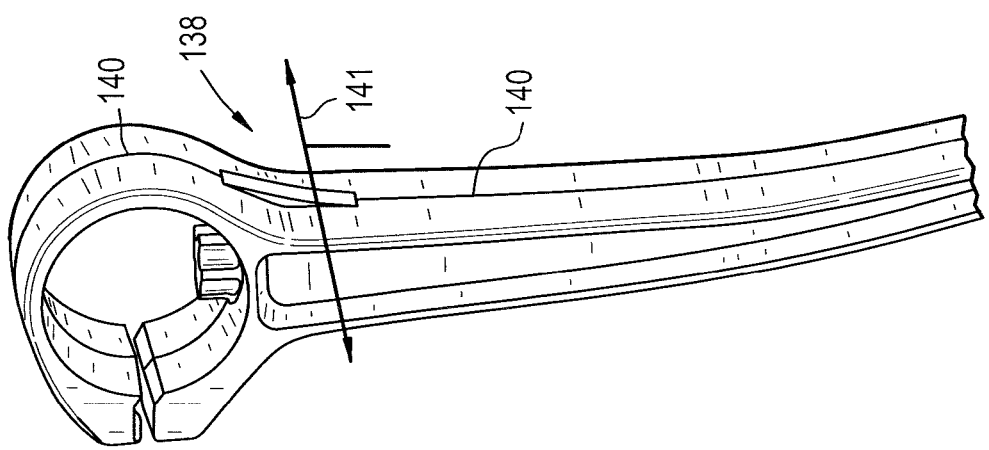

As shown in FIGS. 1 and 2 of the present application, the tine 22a which is in accordance with an embodiment of the present invention has a parting line which is front-to-rear, rather than having a parting line which is lateral. In FIGS. 1 and 2, reference numeral 100 identifies the front-to-rear parting line on the tine 22a, while reference numeral 101 identifies the direction the mold halves open in molding the tine 22a. For comparison purposes, FIGS. 4 and 5 show tines 138, 139 with lateral parting lines 140, and identify the mold opening direction with arrow 141.

Preferably, the tine 22a which is shown in FIGS. 1 and 2 is injection molded and formed of a polymer. As shown, the tine 22a preferably has a portion 104, such as a snap ring or strap portion, which is configured to engage and wrap around a bat tube (i.e., part 26 in FIG. 3). The tine 22a also includes a finger portion 106 which is configured to engage the crop during operation of the harvester. Preferably, the front-to-rear parting line 100 runs along both portions 104 and 106.

By parting the mold front-to-rear, material saving features can be configured in the form of, for example, front-to-rear depressions (identified with reference numeral 108 in FIGS. 1 and 2), such as oval depressions, which allow for deeper front-to-rear cross sections while maintaining relatively consistent wall thicknesses. This deep front-to-rear cross section allows for higher rigidity in the high stress areas of the tine 22a (reference numeral 110 in FIG. 1 identifies a high stress area, while reference numeral 112 identifies the normal direction of deflection during operation), yet maintains front-to-rear deflection stability, which is problematic when the parting line is lateral and if a deep front-to-rear cross section were attempted to be utilized. Trying to provide deep cross sections with a lateral parting line would either result in very heavy wall thicknesses, which are difficult to process, or material saving depressions trying to be provided in the lateral direction, which would create cross sections having poor front-to-back deflection stability. In contrast, providing a front-to-back parting line 100, such as in the finger portion 106 as shown in FIGS. 1 and 2, allows for deep cross sections with material saving front-to-back depressions 108 that minimize wall thicknesses and total material used for better processing, yet maintain front-to-back rigidity and deflection stability. The relatively consistent wall thickness reduces process cycle times and promotes even pack out, which reduces scrap rate.

Figure 6:
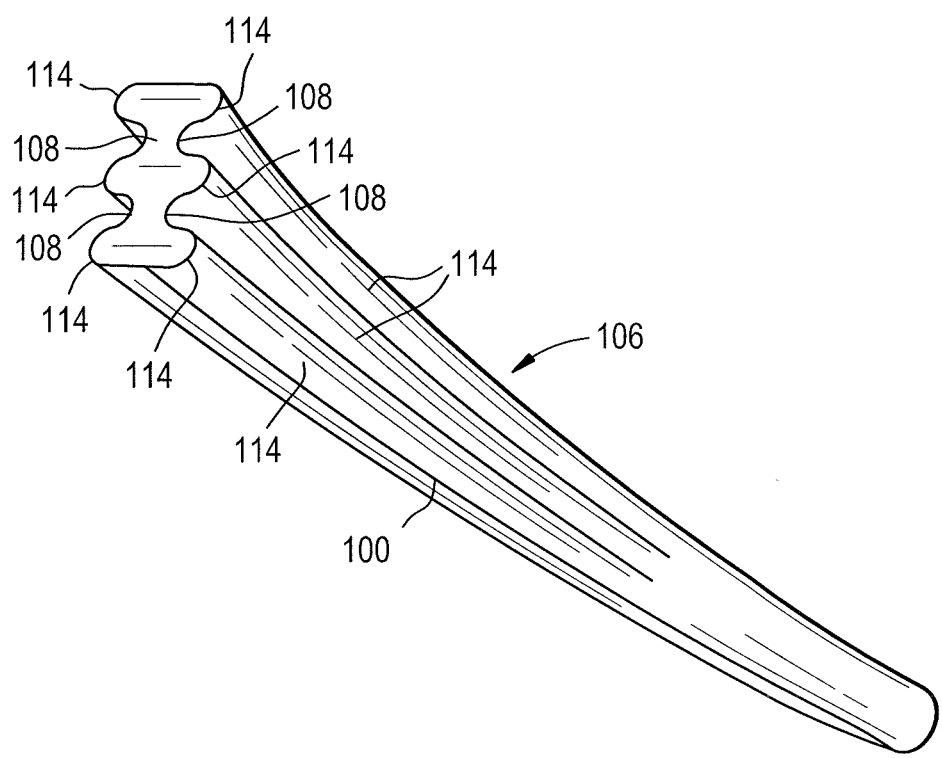
FIG. 6 provides a perspective view of a portion of the tine 22*a* shown in FIGS. 1 and 2, taken along line 6-6 of FIGS. 1 and 2.

FIGS. 1 and 2 show the tine 22a having two deep depressions 108 (such as oval depressions), resulting in the tine also having three projections 114 (such as oval projections), in the font-to-rear direction. FIG. 6 provides a perspective view of a portion of the tine 22a shown in FIGS. 1 and 2, taken along line 6-6 of FIGS. 1 and 2 and readily shows the depressions 108 and the projections 114 which preferably exist on both sides of the finger portion of the tine 22a. FIG. 6 also shows the parting line 100.

It should be understood that a tine which is in accordance with the present invention can have fewer or more depressions and/or projections than that which is shown in FIGS. 1 and 2 while still staying within the scope of the present invention. For example, FIGS. 7-12 illustrate tines 22b, 22c, 22d which are in accordance with alternative embodiments of the present invention, having differing numbers of depressions and projections. Each of these tines 22b, 22c, 22d can be used in connection with the harvester 10 shown in FIG. 3, for example, or any other harvester or pick-up reel that uses tines. In each of FIGS. 7-12, the parting line is identified with reference numeral 100.

Figure 9:
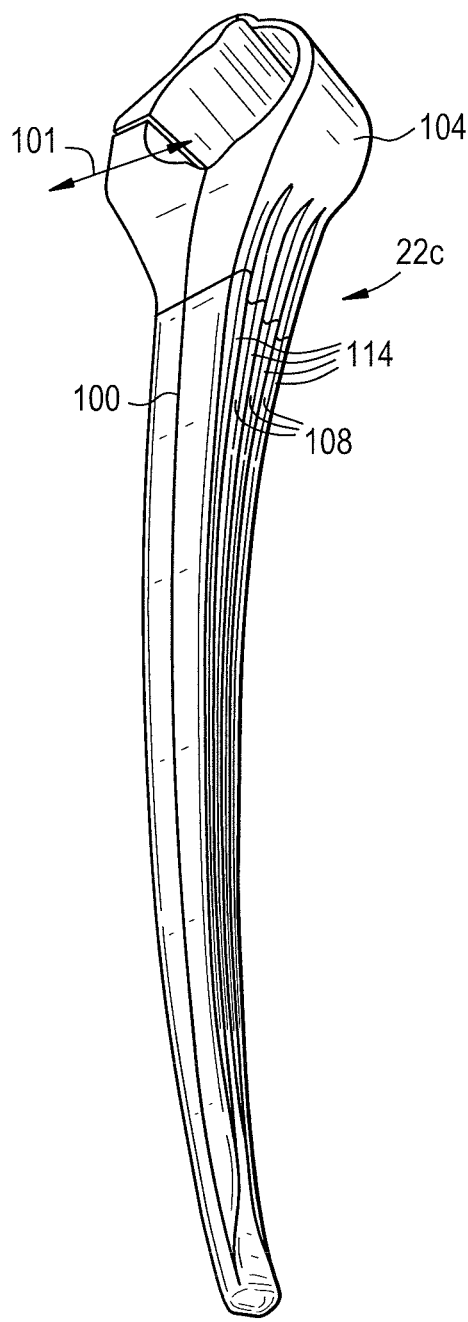
Figure 10:
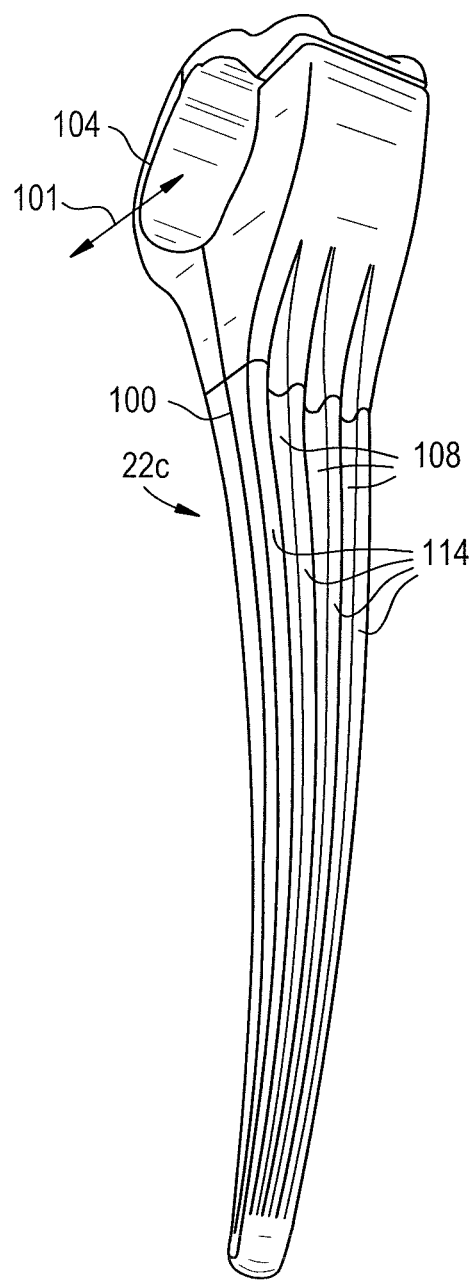
Figure 11:
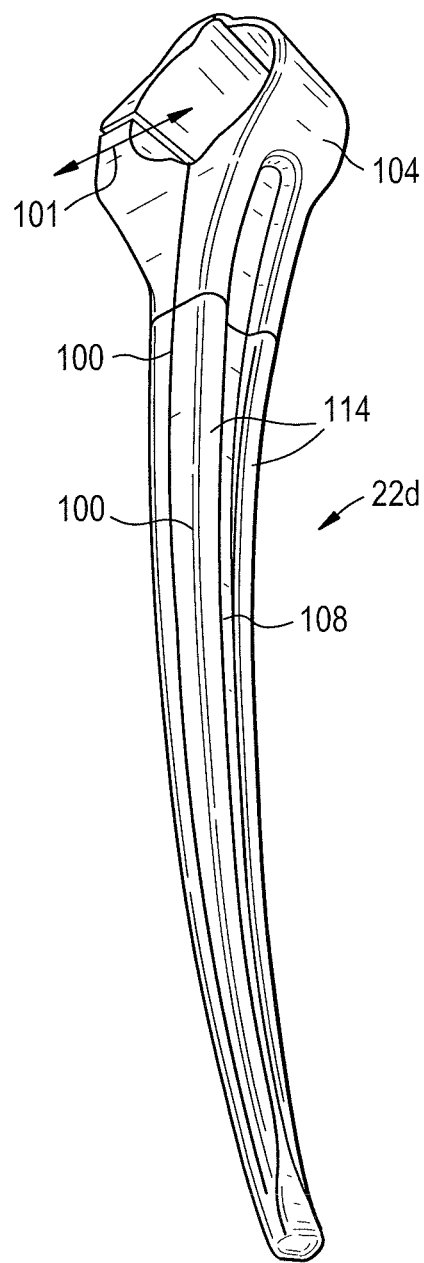
Figure 12:
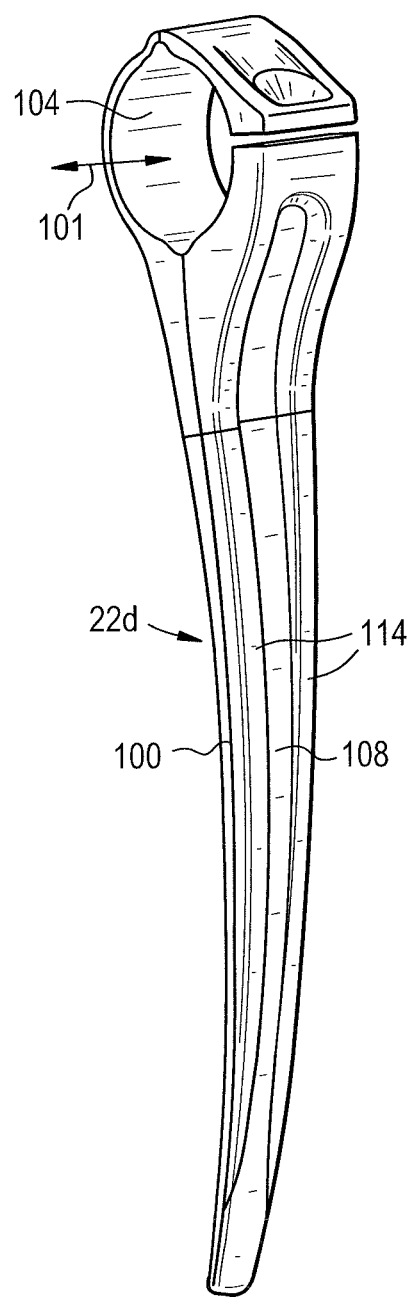

Specifically, the tine 22b shown in FIGS. 7 and 8 has five projections 114 and four depressions 108, the tine 22c shown in FIGS. 9 and 10 has four projections 114 and three depressions 108, and the tine 22d shown in FIGS. 11 and 12 has two projections 114 and one depression 108. As shown, each tine 22b, 22c, 22d also includes a snap ring or strap portion 104, which is configured to engage and wrap around a bat tube (i.e., part 26 in FIG. 3), and it is preferably this portion, as well as the finger portion 106, which has the front to rear parting line 100 (as mentioned, the mold opening direction is identified in FIGS. 7-12 with arrow 101). As shown, in each case, preferably the projections 114 and depressions 108 generally start in the strap portion 104 and generally run parallel to each other along the finger portion 108 to the end.

It should be pointed out that while certain specific alternative embodiments are illustrated in FIGS. 7-12, still other variations are entirely possible while staying fully within the scope of the present invention.

While specific embodiments of the invention have been shown and described, it is envisioned that those skilled in the art may devise various modifications without departing from the spirit and scope of the present invention.

What is claimed is:

1. A tine configured to engage a bat tube of a pick-up reel of a harvester, wherein the tine comprises a strap portion configured to engage and wrap around the bat tube and a finger portion which extends longitudinally from the strap portion to an opposite end of the tine, wherein the finger portion comprises a front and a back, wherein the finger portion comprises a plurality of depressions and a plurality of projections both on the front of the finger portion and the back of the finger portion, wherein the plurality of projections and the plurality of depressions run parallel to each other along the front and back of the finger portion of the tine, and wherein the plurality of projections and the plurality of depressions run longitudinally in a direction from the strap portion of the tine to the opposite end of the tine, along the front and back of the finger portion of the tine.

2. A tine as recited in claim 1, wherein the tine is injection molded and formed of a polymer.

3. A tine as recited in claim 1, said tine comprising a front-to-rear parting line which runs along the finger portion of the tine and which is located on sides of the finger portion of the tine as opposed to being located on the front and back of the finger portion of the tine.

4. A tine as recited in claim 1, wherein each of the plurality of projections is oval.

5. A tine as recited in claim 1, wherein the tine is a single piece.

6. A tine as recited in claim 1, wherein the plurality of projections and the plurality of depressions start in the strap portion of the tine.

* * * * *